United States Patent [19]
Lee et al.

[11] Patent Number: 5,809,223
[45] Date of Patent: Sep. 15, 1998

[54] NETWORK HIBERNATION SYSTEM AND A CONTROL METHOD THEREOF

[75] Inventors: Sang-Jin Lee; Jong-Sung Choi, both of Suwon, Rep. of Korea

[73] Assignee: SamSung Electronics Co., Ltd., Suwon, Rep. of Korea

[21] Appl. No.: 746,227

[22] Filed: Nov. 7, 1996

[30] Foreign Application Priority Data

Nov. 7, 1995 [KR] Rep. of Korea ............... 95-40100

[51] Int. Cl.⁶ ............................................. G06F 11/00
[52] U.S. Cl. ............................................... 395/182.02
[58] Field of Search ............... 395/182.02, 182.12, 395/182.2, 183.12, 182.22, 750, 750.01, 750.02, 750.05, 750.07, 750.08; 364/707, 273.4, 285.3, 944.61, 945.2

[56] References Cited

U.S. PATENT DOCUMENTS

| | | | |
|---|---|---|---|
| 4,763,333 | 8/1988 | Byrd | 371/66 |
| 4,885,521 | 12/1989 | Crampton | 320/14 |
| 5,247,619 | 9/1993 | Mutoh et al. | 395/325 |
| 5,283,905 | 2/1994 | Saadeh et al. | 395/750 |
| 5,311,441 | 5/1994 | Tayama et al. | 364/483 |
| 5,315,161 | 5/1994 | Robinson et al. | 307/66 |
| 5,317,752 | 5/1994 | Jewett et al. | 395/750 |
| 5,386,552 | 1/1995 | Garney | 395/575 |
| 5,396,637 | 3/1995 | Harwell et al. | 395/750 |
| 5,428,806 | 6/1995 | Pocrass | 395/800 |
| 5,432,946 | 7/1995 | Allard et al. | 395/750 |
| 5,485,623 | 1/1996 | Kurokawa et al. | 395/182.2 |
| 5,530,877 | 6/1996 | Hanaoka | 395/750 |
| 5,603,038 | 2/1997 | Crump et al. | 395/750 |
| 5,687,308 | 11/1997 | Jardine et al. | 395/182.02 |

*Primary Examiner*—Robert W. Beausoliel, Jr.
*Assistant Examiner*—Stephen C. Elmore
*Attorney, Agent, or Firm*—Robert E. Bushnell, Esq.,

[57] ABSTRACT

A network hibernation system and method for a computer connected to a network, comprising a power management controller for generating a time-out signal when the computer fails to provide an event signal indicative of an active operational state of the computer, to the power management controller within a predetermined time period, a data backup power supply for generating an ac-down signal indicating that AC-power supply is abruptly interrupted, an OR gate for outputting a hibernation interrupt signal in response to the time-out signal and the ac-down signal, a network interface for connecting the computer to the network, the network interface generating an network event signal in response to data being received over the network, a network hibernation information memory for storing current information of the network interface, a system control part for outputting a control signal in response to the hibernation interrupt signal, wherein the control signal prevents the power management controller from processing the network event signal generated by the network interface, a random access memory for storing current operating state information of the computer, the random access memory having network hibernation information memory area for storing current information of the network interface, an auxiliary memory for receiving and storing the current operating state information and the current information of the network interface from the random access memory in response to the control signal, and a non-volatile memory for storing hibernation state information.

17 Claims, 5 Drawing Sheets

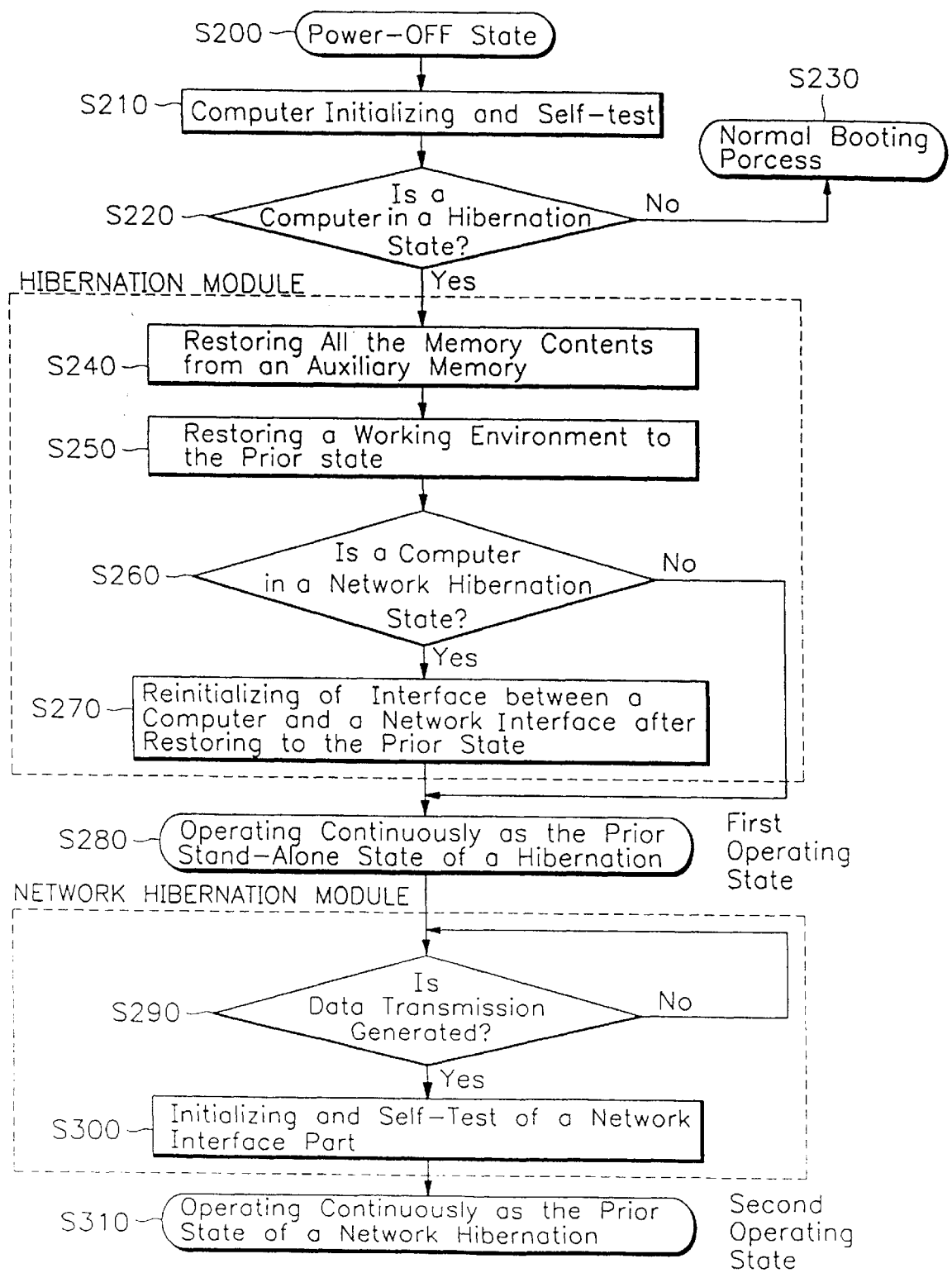

NETWORK HIBERNATION SYSTEM AND A CONTROL METHOD THEREOF

CLAIM OF PRIORITY

This application makes reference to, incorporates the same herein, and claims all benefits accruing under 35 U.S.C §119 from an application entitled *Network Hibernation System And A Control Method Thereof* earlier filed in the Korean Industrial Property Office on 7 Nov. 1995, and there duly assigned Ser. No. 95-40100 by that Office.

BACKGROUND OF THE INVENTION

1. Field of the Invention

The present invention relates to a network hibernation system and a control method. More particularly, the present invention relates to a network hibernation system and a control method able to restore a working state to its original state when power is supplied again after the power to a computer in a network environment had been suddenly interrupted. Additionally, the present invention relates to a network hibernation system and a control method able to easily restore a working environment to its original state when power is supplied again after power had been automatically interrupted when a computer was not used for a predetermined time while in a network environment.

2. Description of the Background Art

Contemporary efforts in the art to avoid loss of data, file corruption or system failure are represented by examples such as the following U.S. patents incorporated herein by reference.

U.S. Pat. No. 5,315,161 to Thomas S. Robinson, et al., entitled *Power Failure Detection And Shut Down Timer* discusses a system and method for providing power from a source of stored electrical energy to a microcomputer for a user established "ride-through" period of time after a disruption in the primary power supply for the microcomputer. If the primary power supply is not restored within the ride-through time period the system performs an orderly shut down of computer applications. Should stored energy reserves run low during the primary power disruption, the system instead performs an abbreviated, critical application shut down. Following application shut down, or upon the expiration of a user established "shut down" time period, the system performs an orderly shut down of computer system operations and thereafter removes all power from the computer. Shut down and shut off procedures are canceled, if possible, upon restoration of the primary power supply.

U.S. Pat. No. 5,530,877 to Masaaki Hanaoka entitled *Apparatus For Providing Continuity Of Operation In A Computer* contemplates an apparatus for providing continuity of operation in a system which performs a process having a CPU, input/output, main memory and power supply by restoring the system state to the point when the power supply was last turned off or an even earlier time is provided. The apparatus includes a save process start detector for detecting a demand for power supply turn-off. The save process is triggered by, for example, the is turning off of a power switch. A power switch state detector detects when a user turns the power switch off and provides an input to an interruption controller. A power off detection program is activated by the interruption controller. A system state saver outputs information indicative of the system state to an external storage in response to an instruction from the save process start detector. A post save processor turns the power supply off after the information indicative of the system state has been completely output to the external storage by the system state saver.

A "hibernation system", as used with respect to the present invention, means a system which includes the following two functions: first, an emergency automatic restoration function for restoring a computer to the previous working state, when power is supplied again after the previous working state of a computer is stored in an auxiliary memory, such as a hard disk, when power is interrupted due to a sudden power-stoppage or an error by a user, according to the contents which is stored in an auxiliary memory; and second a power saving function that automatically interrupts the power supply after storing a previous working state in an auxiliary memory, such as a hard disk, when a computer is not used for a predetermined time, and resumes the supply of power and returns to the previous working environment when the computer is used again. The above-mentioned phrase "in a network environment" refers to a state in which a computer is operatively connected to a network.

Recent personal computer market demands have extended to the area of PCs which have a hibernation system. Documentary records, closest to the prior art of the present invention relates to the emergency automatic restoration function or the power saving function are as follows: An Auxiliary Power Supply Device For A Back-up Of An Emergency Working Environment of Korean Patent Application No. 93-31255 filed on Dec. 30, 1993; A Stop Clock Control Device And A Method Thereof of Korean Patent Application No. 94-13919 filed on Jun. 20, 1994; A Power Control Device For A Peripheral Equipment Of A Computer of Korean Utility Model Registration Application No. 93-3116 filed on Mar. 4, 1993; and A Power Interrupting Signal Generating Circuit For A Peripheral Equipment Of A Computer of Korean Patent Application No. 92-14590 filed on Aug. 13, 1992.

However, the above-mentioned prior art has a problem, that is, when a computer is in use in a Personal Computer (PC) Local Area Network (LAN) environment and the power supply is stopped by a sudden power stoppage or in error, although a working environment can be restored into a previous working state under the stand-alone state, the previous work is lost as a result and can not be restored under the network environment.

To resolve the problem of the prior art, the art of A Network Hibernation System is cited in Korean Patent Application No. 94-27299 filed on Oct. 25, 1994, now U.S. patent application Ser. No. 08/547,422 now U.S. Pat. No. 5,708,820: when a user is using a computer under the network environment, if power is supplied again after a power supply is stopped due to a sudden power stoppage or an operational error, it can restore a working environment to the previous state. And also, when a user does not use a computer for a predetermined time under the network environment, if power is supplied again after power is interrupted automatically, it restores a working environment to the previous state, so unnecessary power consumption is minimized.

A problem with the foregoing art is that a software interrupt number cannot be used in another application program by invoking a network hibernation module from a hibernation module in the case that a hibernation module calling method to a network hibernation module is a software interrupt method. Also, there is a problem in which embodying a course of invoking a network hibernation module from a hibernation module in some Operation System (OS) environments becomes more and more complex.

SUMMARY OF THE INVENTION

Accordingly, it is therefore an object of the present invention to provide a network hibernation system and method that does not have a special memory in a network interface part.

It is another object of the present invention to provide a network hibernation system and method to restore a computer's working environment to a previous state more simply and easily without a course of invoking a network interface module from a hibernation module, when the computer, having had its a power supply stopped by a sudden power stoppage or by user error while in use in a network environment, is again supplied with power, by composing a hibernation module and a network hibernation module each independently.

It is a further object of the present invention to provide a network hibernation system and method to be able to easily restore a working environment to the previous state, when power is supplied again after the power had been automatically interrupted due to the lack of use of the computer for a predetermined time in the network environment, in accordance with a memory managing function of an operation system.

In order to achieve the above and other objects, the present invention contemplates including a memory for storing hibernation information: a power managing part for outputting a time-over signal in case that an event is not generated from a peripheral equipment for a predetermined time; a data back-up power supply part for outputting a power-stoppage sensor signal as well as outputting emergency power from a battery in case a power supply is interrupted by a sudden power-stoppage or in error, and to interrupt the power from a battery in case of a power interrupting signal; a control part for outputting a power interrupting signal to a hibernation state after backing up data under the network environment and to make the signal be in a hibernation state in case that a power-stoppage sensor signal is inputted from the power managing part or a time-over signal is inputted from the power-supply part for data back-up; to make a computer be operated under the network environment equal to the previous network environment by restoring backed-up data from memory and restoring a working environment to the prior state in case that power is supplied again, in case that a power-stoppage sensor signal is inputted from the power managing part or a time-over signal is inputted from the power-supply part for the data back-up.

In order to achieve the above and other objects, the present invention contemplates a loading method of the network hibernation module of the present invention including: a step for initializing the network interface part when the action is started; a step for determining a network hibernation is enabled and to disable an event signal used in a network interface part in case that a network hibernation is enabled; a step for storing network interface information in the network hibernation information section of a memory; a step for storing information showing a network hibernation module does a loading in a system and interrupt information or an address of a network hibernation module in a memory; and, a step for loading a process routine of a network driver in a memory.

In order to achieve the above and other objects, the present invention contemplates a loading method to resume the present invention including: a step for initializing and performing a self-test of a computer when power is supplied again on a power-off state; a step for performing a normal booting process if a computer is not in a hibernation mode or restoring the data and the working environment prior to the power-off state by restoring all the contents from an auxiliary memory in a memory if a computer is in a hibernation mode; a step for determining if a computer is in a hibernation mode, to let a computer operate as a stand-alone after reinitializing an interface between a computer and an interface in case of a network hibernation state; a step for determining if a computer operates as a stand-alone state before a hibernation and data transmission occurs, to initialize and to reset a network interface part if data transmission occurs; and, a step that a computer operates continuously as the prior state to a network hibernation.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein:

FIG. 7 is a operation flow chart showing a network hibernation resuming course according to the preferred embodiment of the present invention.

DETAILED DESCRIPTION OF THE PREFERRED EMBODIMENTS

Hereinafter, a network hibernation system and a control method thereof is explained with reference to an accompanying drawings.

Figure 1:
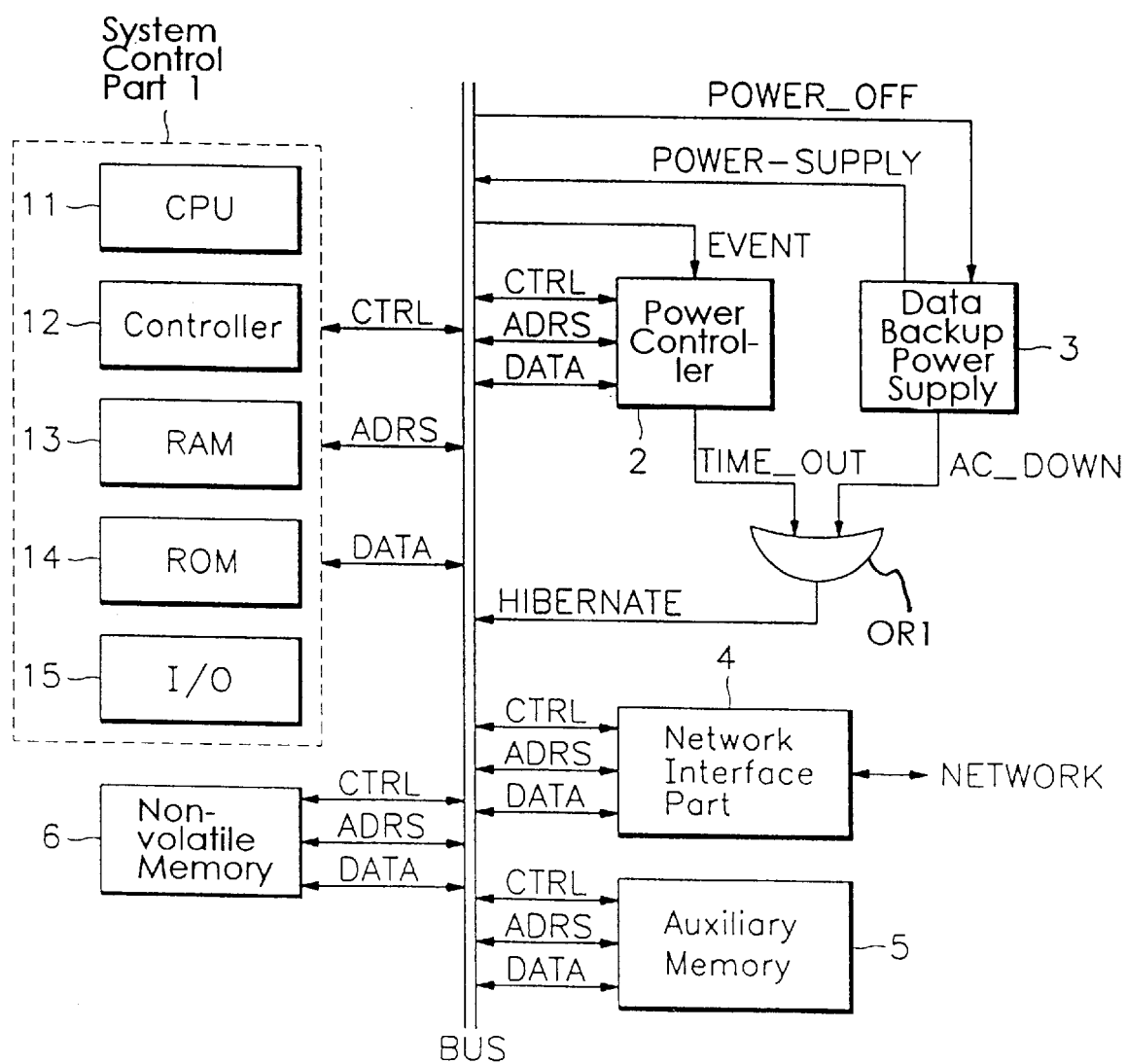
FIG. 1 is a block diagram showing the network hibernation system constructed according to the principles of the present invention.

Referring now to the drawings and particularly to FIG. 1, which illustrates a network hibernation system as constructed according to the principles of the present invention. The network hibernation system includes a system control part 1 for controlling the network hibernation and controlling data back up in the event of a power failure or when a computer is in a non-use state and subsequently recovering data from the computer in a network environment; a power management (PMS) controller 2 for monitoring whether the computer is in a non-use period of operation and generating a TIME_OUT signal indicating that the computer is in the non-use period; a data backup power supply 3 for providing backup power when backing up data of the computer in the event of a power failure and generating a AC_DOWN signal indicating that AC-power supply is abruptly interrupted because of a power failure; a network interface 4 for connecting the computer to a local area network enabling the computer to operate in the network environment, network interface 4 does not include a special memory; an auxiliary memory 5 for storing data of the computer in the network environment when the AC-power supply is abruptly interrupted due to power failure or user error, or alternatively, when the computer is suspended during a non-use period; and a non-volatile memory 6 for storing system state information.

System control part 1 of the network hibernation system comprises a CPU (central processing unit) 11 for controlling operation of the network hibernation system, an auxiliary controller 12 for supporting commands of CPU 11, a RAM 13 for storing at least a local hibernation module, a ROM 14, and an I/O port (input/output) 15. Auxiliary controller 12 typically includes a bus controller for controlling a data bus, a DMA controller for reading or writing data onto the memory from the I/O device without CPU 11, and an interrupt controller for controlling interruption from auxiliary devices such as, for example, keyboard, mouse, floppy disk drive and serial port to CPU 11.

Figure 2:
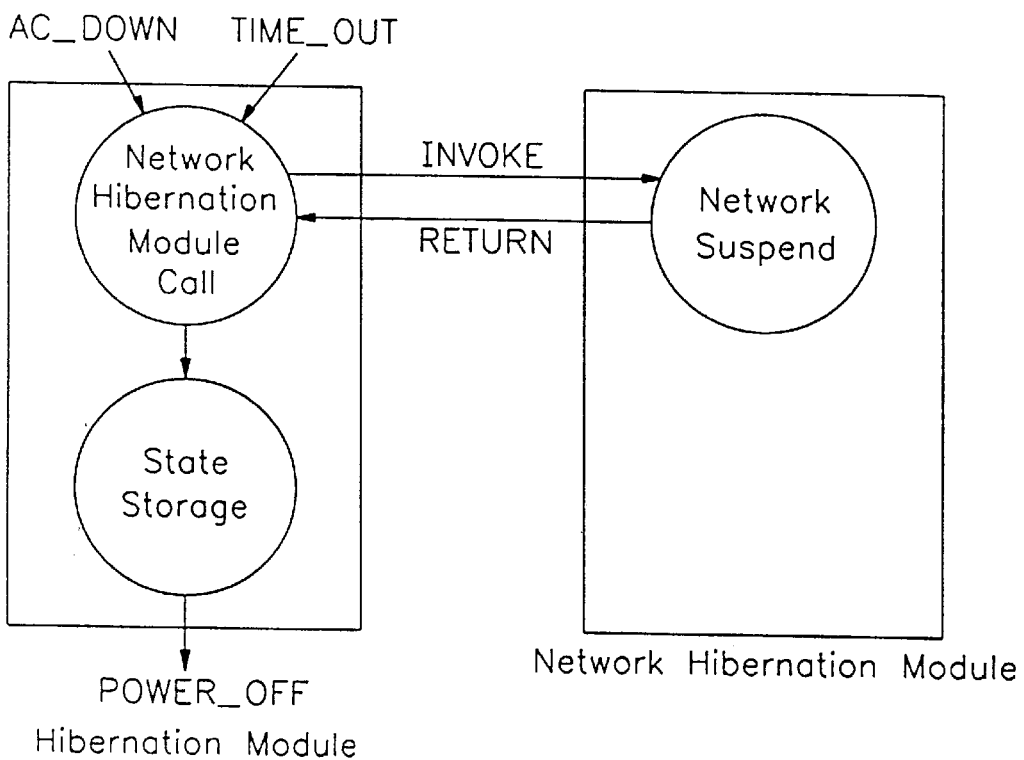
FIG. 2 is a diagram showing a network hibernation module being invoked when power is interrupted.
Figure 3:
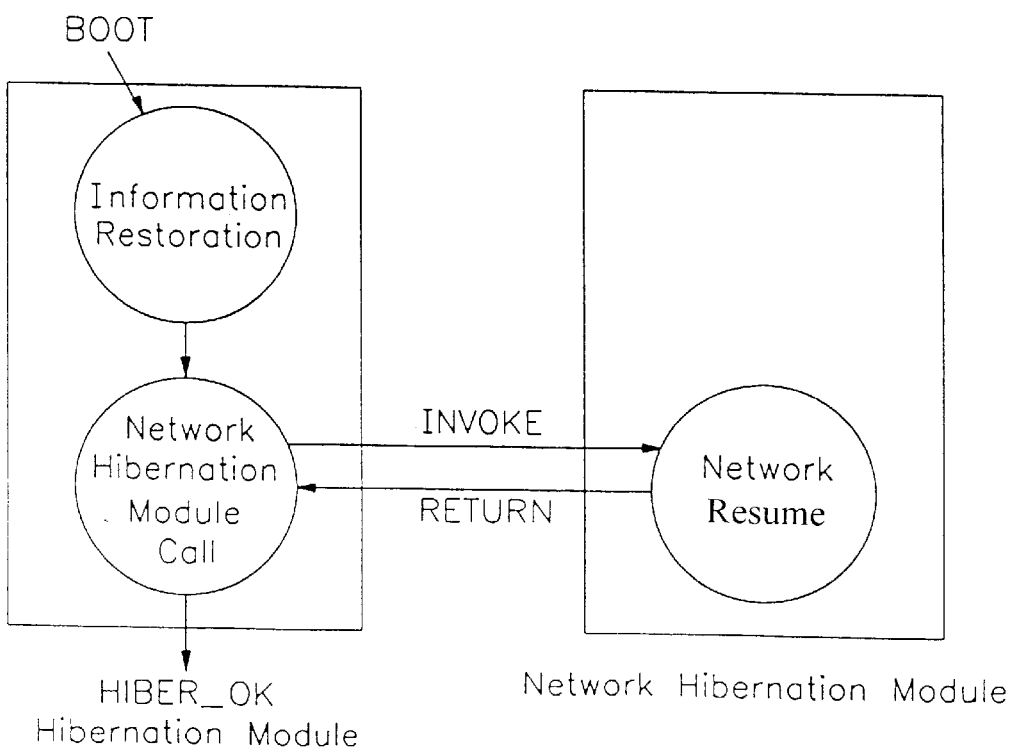
FIG. 3 is a diagram showing a network hibernation module being called when it is booting.

FIGS. 2 and 3 illustrate the execution of a suspend process and a resume process discussed in copending application Ser. No. 08/547,442, wherein a network hibernation module is invoked from a local hibernation module.

As depicted FIG. 2, a network hibernation module is invoked upon detection of either an AC_DOWN signal or a TIME_OUT signal indicating that AC-power is cut off because of either a power failure or detection of a non-use state during operation. When a system control part receives either the TIME_OUT signal or AC_DOWN signal a local hibernation module reads network hibernation information, such as a network hibernation interrupt and network hibernation address stored in a non-volatile memory to call the network hibernation module in order to suspend operation of the computer in the network environment. When the local hibernation module reads the network hibernation interrupt stored in the non-volatile memory, it detects starting address data from an interrupt vector table of the network hibernation module and transfers control data to the network hibernation module. When the local hibernation module, on the other hand, reads the network hibernation address stored in the non-volatile memory, it relies upon such address data to locate a corresponding address of the network hibernation module for suspending operation of the computer in the network environment.

Next, as depicted by FIG. 3, when power is restored, a central processing unit determines whether the current operational state of the computer is a network hibernation state by determining whether or not a hibernation flag stored in the nonvolatile memory is set, and invokes a resume process of the network hibernation module when the current state is determined to be the network hibernation state. The central processing unit initializes a network interface and recovers the content of a special memory in the network interface when it is determined that the hibernation flag was set. Next, the central processing unit resets the network interface and thereafter, enables the network interface. When the resume process of the network hibernation module is invoked, the resume processes of the network hibernation module are performed. After the resume processes of the network hibernation module are completed, the computer returns to the local hibernation module. When the computer returns from the resume process of the local hibernation module, the central process unit continues to operate the computer according to the state prior to the hibernation state.

As shown in the above, in an embodiment of the invention, if the power supply is interrupted abruptly and is turned on again in the computer under the network environment, the working environment can be recovered to the former state and also, if the computer does not operate for sometime in the network environment, the power supply is interrupted automatically, and thereafter, if the power supply is applied again, the computer recovers the former state so that the power consumed can be retrenched. The effect of this invention can be utilized in the region of the computer which has automatic backing up function in an emergency and a retrenching function of the electric power.

Figure 4:
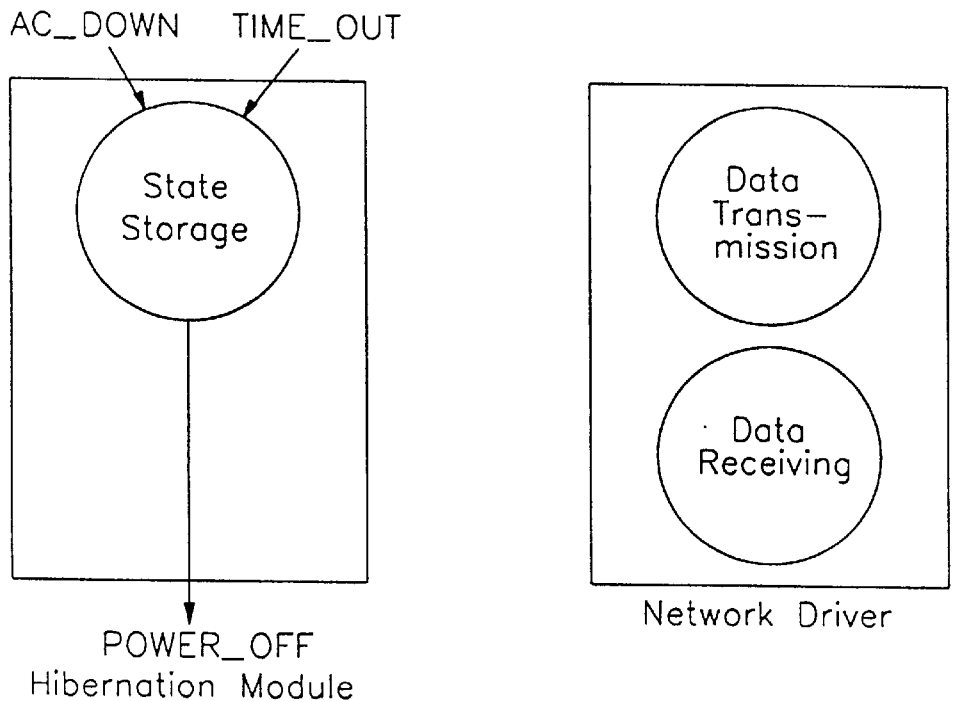
FIG. 4 is a diagram showing a network hibernation suspend course according to the preferred embodiment of the present invention.
Figure 5:
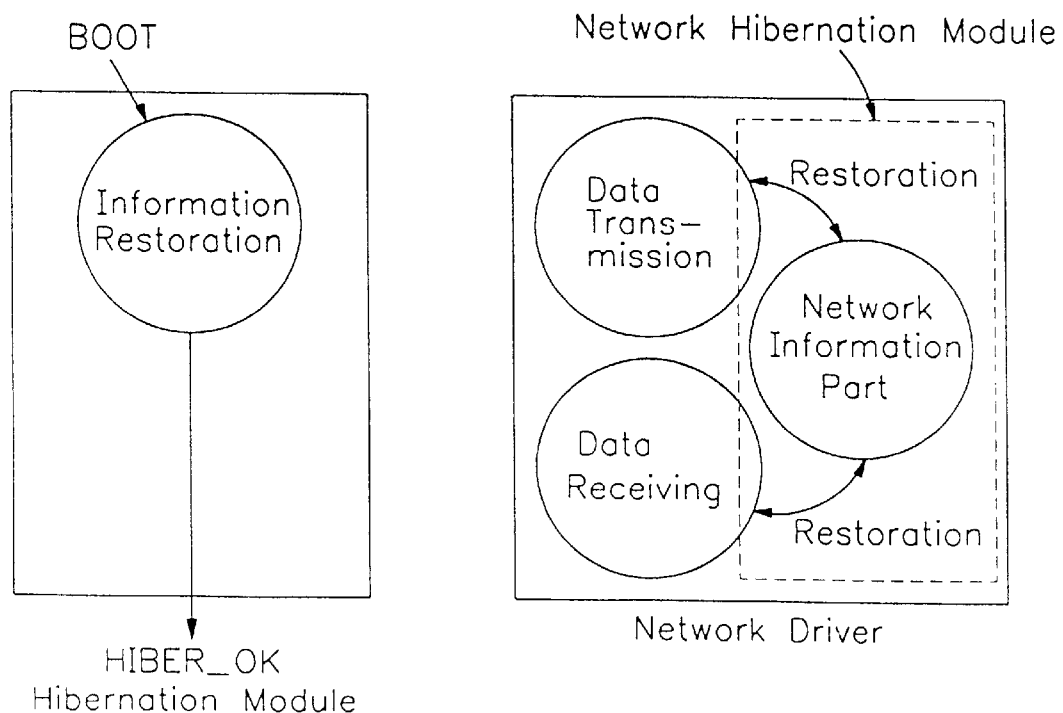
FIG. 5 is a diagram showing a network hibernation resuming course according to the preferred embodiment of the present invention.

FIGS. 4 and 5, however, illustrate a suspend process and resume process according to the principles of the present invention, wherein the network hibernation module and the local hibernation module are independent of each other. That is, the local hibernation module executes the suspend process when power is cut off, and when power is again supplied, executes the resume process and executes a data transmission process by initializing network interface 4.

In FIG. 4 when CPU 4 of system control part 1 detects either an AC_DOWN signal or a TIME_OUT signal indicating that AC-power is cut off because of either a power failure or detection of a non-use state during operation, respectively, information regarding the current operating state of the computer is stored in auxiliary memory 5 and the local hibernation module executes the suspend process when power is cut off. Next, as shown in FIG. 5, when power is restored to the system, CPU 11 restores the computer to the previous operating state by reading out the information stored in auxiliary memory 5 and the local hibernation module executes the resume process.

All the network software in a network communication is always ready to recover from a network error which can be generated by an interference, an interruption, or noise on the communication cable. Accordingly, if a computer, a network interface and a network driver are restored to the state preceding power-off, network software existing on a higher level automatically restores data lost during a power supply interrupted term. The preferred embodiment of the present invention has a possibility of losing data when a computer is suspended, because it does not perform a reset of the network hibernation module by the above-mentioned method.

When an operation of a computer is started, when power is supplied, then an operation of the network hibernation system according to the preferred embodiment of the present invention is started according to a user loading a network hibernation module with a network driver module on a system memory.

Figure 6:
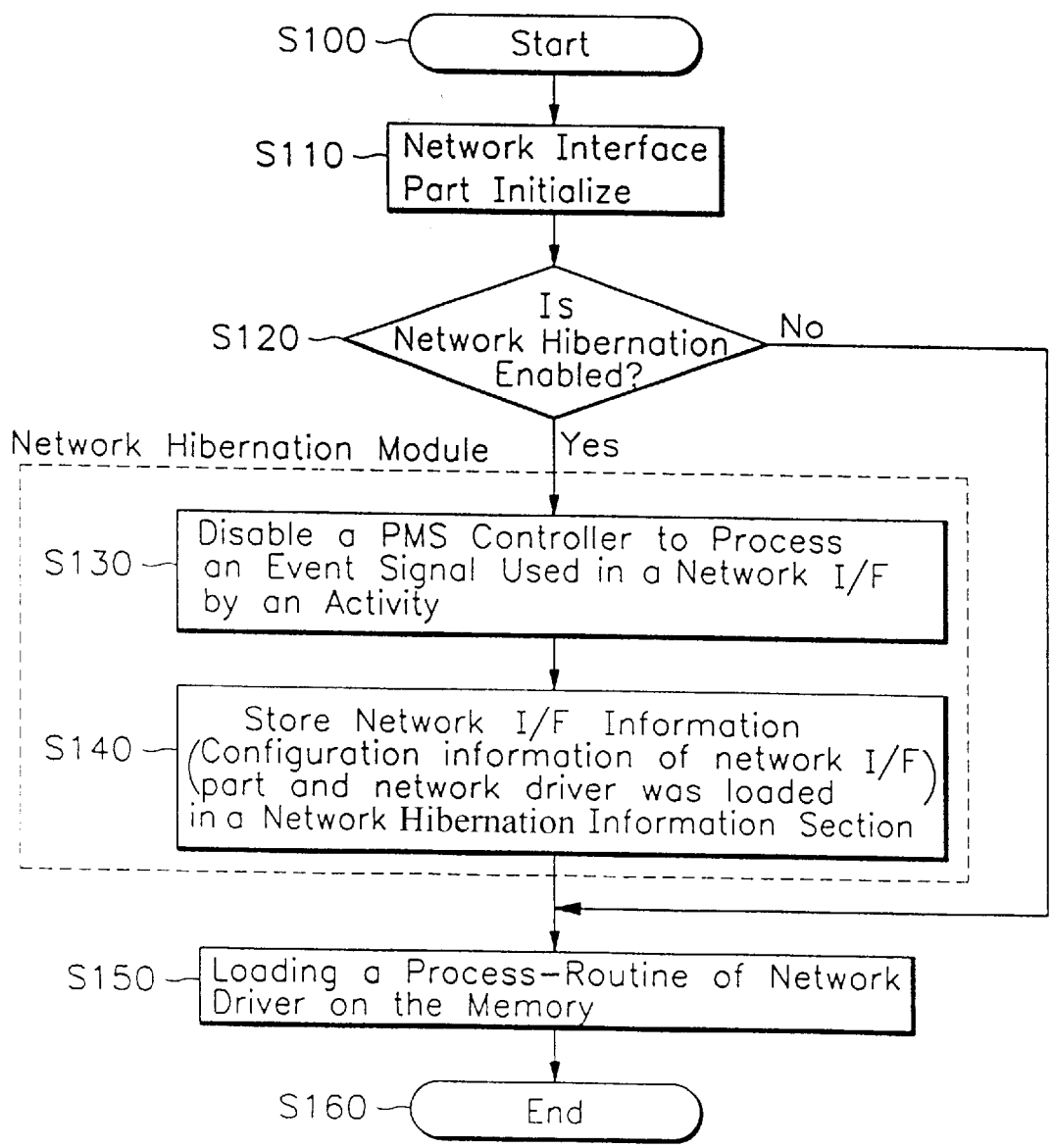
FIG. 6 is a operation flow chart showing a loading course of a process routine of a network driver in a RAM according to the preferred embodiment of the present invention.

A loading process of a network hibernation module in a memory is depicted in attached FIG. 6. To begin with, after the process starts (S100) when power is supplied to the computer, CPU 11 of system control part 1 performs an initialization and self-test of network interface 4 (S110). Subsequently, CPU 11 determines whether a network hibernation is enabled by determining whether a hibernation set-up plug of non-volatile memory 6 is enabled (S120). That is, CPU 11 determines whether or not the network is in a hibernation state by checking whether or not a hibernation flag in non-volatile memory 6 is set. When it is determined that network hibernation is enabled, CPU 11 of system control part 1 disables power management controller 2 to prevent processing of an event signal output by network interface 4 (S130), because once a computer is connected to a network, but is not actively used in the network, data is continuously received through network interface 4, and network interface 4 generates an unconditional interrupt (event signal) upon receipt of the data. As a result, although the computer is not used, power management controller 2 mistakenly determines that the computer is actively in use by an operator according to a generated event signal thus preventing automatic interruption of power supply due to non-use of the computer or its peripheral devices. Accordingly, power supply can only be automatically interrupted due to non-use of the computer after a predetermined time interval by having a relevant interrupt (that is, a relevant event signal) output by network interface 4 disabled.

After disabling power management controller 2 to prevent processing of an event signal output by network interface 4, CPU 11 stores relevant configuration information of network interface 4, that is, an interrupt signal, an input/output address, Direct Memory Access (DMA) information, network driver information and memory information used in network interface 4, in a network hibernation information section of RAM 13 (S140).

When it is determined that network hibernation is not enabled (S120), or after storing network interface information in RAM 13 (S140), CPU 11 loads a process routine of a network driver in memory (S150), and then the loading process ends (S160).

According to the above-mentioned action, after a network driver including a network hibernation module is loaded, a network process routine is performed.

After an action of a network hibernation system is started, if power is interrupted by a sudden power-stoppage or a non-use state for a predetermined time on system control part 1, a hibernation suspend course is performed as called.

A hibernation suspend course according to the preferred embodiment of the present invention is the same to a suspend course in a local hibernation module. That is, it does not invoke a network hibernation module but performs a suspend course in a local hibernation module.

Again, referring to FIG. 1, when a power supply is interrupted by a sudden power-stoppage, data backup power supply 3 generates the AC_DOWN signal after backup power is supplied to the system by a battery. Also, when an event signal (EVENT) is not input to power management controller 2 for a predetermined time, a power management controller 2 outputs the TIME_OUT signal. The AC_DOWN signal and TIME_OUT signal are input to OR gate OR1 and OR gate OR1 outputs a hibernate interrupt (HIBERNATE) signal which is input to CPU 11 through a system bus (BUS).

When the HIBERNATE signal is input into CPU 11, CPU 11 stores a current hardware state of the computer in RAM 13 and then, stores all the contents of RAM 13 into auxiliary memory 5. Next, CPU 11 interrupts the power supplied by a battery by outputting a power interrupt signal (POWER_OFF) to data backup power supply 3.

At this time, a data transmission operation from network interface 4 included in a network driver does not occur any more. When power is again supplied during the hibernation state or a user inputs data by activating the computer or one of its peripheral devices, a resuming course of the local hibernation module is executed as depicted FIG. 7.

Regarding FIG. 7, when power is supplied again or a user inputs data by activating the computer or one of its peripheral devices, CPU 11 of a control part 1 performs a computer initialization and self-test operation (S210) and then determines whether or not the computer is in a hibernation state (S220). If the computer is not in a hibernation state, CPU 11 performs the computer's normal booting process (S230). When it is determined that the computer is in a hibernation state, CPU 11 restores a working environment of the computer to the prior working state by transferring all the data from auxiliary memory 5 into RAM 13 (S240–S250).

CPU 11 then determines whether or not a network hibernation state exists by reading the network hibernation information which was stored in RAM 13 (S260). When CPU 11 determines that a network hibernation state exists, an interface between network interface 4 and the computer is reinitialized by using the network configuration information stored in the network hibernation information section of RAM 13 (S270). That is, it deactivates an interrupt controller, a DMA controller, etc, in a CPU 11. When CPU 11 determines that a network hibernation state does not exist in step S260 or after the interface between the network interface and the computer is reinitialized in step S270, the computer continuously operates in a stand-alone state which was the stand-alone state prior to hibernation (S280). At this time, network interface 4 is not in an operating state.

When it is desired to make a first data transmission (S290) over the network after the computer was returned to the prior stand-alone operating state (S280), an initialization and self-test of network interface 4 is performed by the network hibernation module (S300), and then the data transmission is performed as the computer is setup to continuously operate in the state prior to the network hibernation state (S310) Accordingly, a determination of whether the first data transmission has occurred or not, when a hibernation module is resumed, is by indicating information that network interface 4 is resumed based on network hibernation information stored in RAM 13, and also, when an error has occurred by a data transmission on condition that network interface 4 is not normally resumed, can perceive whether data transmission has occurred by an error information at this time. After performing a relevant action according to the data transmission, the computer operates according to the prior network hibernation state (S310).

The preferred embodiment of the present invention can provide a network hibernation system and the control method thereof more simply and easily, as it has not used a special memory and a course of invoking a network interface module from a hibernation module, by composing a hibernation module and a network hibernation module separately and respectively. And it can provide a network hibernation system and the control method thereof which have effects that can reduce a working environment to the prior state if power is supplied again after power is suddenly interrupted on a computer under the network environment and can reduce power consumption by restoring a working environment to the prior state if a user supplies power again after power is automatically interrupted when a computer is not used for a predetermined time under the network environment.

What is claimed is:

1. A network hibernation system for a computer connected to a network, said network hibernation system comprising:

a power management controller for generating a time-out signal when said computer fails to provide an event signal indicative of an active operational state of said computer, to said power management controller within a predetermined time period;

a data back-up power supply for generating an ac-down signal indicating that AC-power supply is abruptly interrupted;

signal generating means for outputting a hibernation interrupt signal in response to said time-out signal and said ac-down signal;

a network interface for connecting said computer to said network, said network interface generating an network event signal in response to data being received over said network;

a network hibernation information memory for storing current information of said network interface;

a system control part for outputting a control signal in response to said hibernation interrupt signal, wherein said control signal prevents said power management controller from processing said network event signal generated by said network interface;

an auxiliary memory for storing current operating state information and for storing said current information of said network interface from said network hibernation information memory in response to said control signal; and a non-volatile memory for storing hibernation state information.

2. The network hibernation system as set forth in claim 1, further comprising:

said system control part generating a power-off signal for stopping said data back-up power supply from generating backup power after said current operating state information and said current information of said network interface are stored in said auxiliary memory.

3. The network hibernation system as set forth in claim 2, further comprising:

said system control part generating a second control signal when ac power is again supplied to said computer or when a user again activates a portion of said computer after said system control part generated said power-off signal;

said system control part performing an initialization and self-test operation in response to said second control signal;

said system control part reading said hibernation state information stored in said non-volatile memory for determining whether said computer is in a hibernation state;

said system control part restoring said computer to a prior operating state by restoring said network interface stored in said auxiliary memory to said network hibernation information memory;

said system control part determining whether said computer is in a network hibernation state by reading said current information of said network interface restored in said network hibernation information memory;

said system control part controlling initialization of an interface between said computer and said network interface when it is determined that said computer is in a network hibernation state; and said computer operating in a stand-alone state after said system control part controls the initialization of an interface between said computer and said network interface or after said system control part determines that said computer is not in a network hibernation state.

4. The network hibernation system as set forth in claim 1, further comprising:

said system control part generating a second control signal when ac power is supplied to said computer or when a user activates a portion of said computer;

said system control part performing an initialization and self-test operation in response to said second control signal;

said system control part reading said hibernation state information stored in said non-volatile memory for determining whether said computer is in a hibernation state;

said system control part restoring said computer to a prior operating state by restoring said current information of said network interface stored in said auxiliary memory to said network hibernation information memory;

said system control part determining whether said computer is in a network hibernation state by reading said current information of said network interface restored in said network hibernation information memory;

said system control part controlling initialization of an interface between said computer and said network interface when it is determined that said computer is in a network hibernation state; and said computer operating in a stand-alone state after said system control part controls the initialization of an interface between said computer and said network interface or after said system control part determines that said computer is not in a network hibernation state.

5. The network hibernation system as set forth in claim 3, further comprising:

said network interface performing an initialization and self-test operation when it is desired to transmit data over said network a first time when said computer is in said stand-alone state; and said computer continuously operating according to a state prior to network hibernation after said network interface performs said initialization and self-test operation.

6. The network hibernation system as set forth in claim 1, further comprising:

a random access memory comprising:

a first memory area for storing said current operating state information of said computer, said current operating state information of said computer being read from said first memory area and stored in said auxiliary memory in response to said control signal; and a second memory area designated as said network hibernation information memory for storing said current information of said network interface.

7. A network hibernation method for a computer operating in a network, said method comprising the steps of:

generating a time-out signal when a user fails to operate said computer within a predetermined time period;

generating an ac-down signal when an ac power supply is abruptly interrupted;

generating a hibernation interrupt signal in response to said time-out signal and said ac-down signal;

storing current working state information of said computer in a random access memory;

storing current network interface information into a network hibernation information section of said random access memory;

generating a control signal in response to said hibernation interrupt signal;

outputting said current working state information and said current network interface information from said random access memory for storage in an auxiliary memory in response to said control signal; and storing hibernation state information in a non-volatile memory.

8. The method as set forth in claim 7, further comprising a step of:

generating a power-off signal for stopping a data back-up power supply from generating backup power after said current working state information and said current network interface information are stored in said auxiliary memory.

9. The network hibernation system as set forth in claim 8, further comprising:

generating a second control signal when ac power is supplied to said computer or when a user activates a portion of said computer after generating said power-off signal;

performing an initialization and self-test operation of a central processing unit in response to said second control signal;

reading said hibernation state information stored in said non-volatile memory for determining whether said computer is in a hibernation state;

restoring said computer to a prior working state by reading out said current working state information and said current network interface information stored in said auxiliary memory for restorage in said random access memory;

determining whether said computer is in a network hibernation state by reading said current network interface information restored in said random access memory;

initialization of an interface between said computer and a network interface when it is determined that said computer is in a network hibernation state; and operating said computer in a stand-alone state after said step of initialization of said interface between said computer and said network interface or after determining that said computer is not in a network hibernation state.

10. The method as set forth in claim 7, further comprising the steps of:

generating a second control signal when ac power is supplied to said computer or when a user activates a portion of said computer;

performing an initialization and self-test operation of a central processing unit in response to said second control signal;

reading said hibernation state information stored in said non-volatile memory for determining whether said computer is in a hibernation state;

restoring said computer to a prior working state by reading out said current working state information and said current network interface information stored in said auxiliary memory for restorage in said random access memory;

determining whether said computer is in a network hibernation state by reading said current network interface information restored in said random access memory;

initialization of an interface between said computer and a network interface when it is determined that said computer is in a network hibernation state; and operating said computer in a stand-alone state after said step of initialization of said interface between said computer and said network interface or after determining that said computer is not in a network hibernation state.

11. The method as set forth in claim 10, further comprising:

determining whether said computer is attempting to transmit data over said network a first time when said computer is in said stand-alone state;

performing an initialization and self-test operation in said network interface when it is determined that said computer is attempting to transmit data over said network a first time when said computer is in said stand-alone state; and operating said computer according to a state prior to network hibernation after said network interface performs said initialization and self-test operation.

12. A network hibernation system for a computer connected to a network, said network hibernation system comprising:

a power management controller for generating a time-out signal when said computer fails to provide an event signal indicative of an active operational state of said computer, to said power management controller within a predetermined time period;

a data back-up power supply for generating an ac-down signal indicating that AC-power supply is abruptly interrupted;

means for generating a hibernation interrupt signal in response to said time-out signal and said ac-down signal;

a network interface for connecting said computer to said network, said network interface generating an network event signal in response to data being received over said network;

a system control part for outputting a control signal in response to said hibernation interrupt signal, wherein said control signal prevents said power management controller from processing said network event signal generated by said network interface;

a random access memory for storing current operating state information of said computer, said random access memory having network hibernation information memory area for storing current information of said network interface;

an auxiliary memory for receiving and storing said current operating state information and said current information of said network interface from said random access memory in response to said control signal; and a non-volatile memory for storing hibernation state information.

13. The network hibernation system as set forth in claim 12, further comprising:

said system control part generating a power-off signal for stopping said data back-up power supply from generating backup power after said current operating state information and said current information of said network interface are stored in said auxiliary memory.

14. The network hibernation system as set forth in claim 13, further comprising:

said system control part generating a second control signal when ac power is again supplied to said computer or when a user again activates a portion of said computer after said system control part generated said power-off signal;

said system control part performing an initialization and self-test operation in response to said second control signal;

said system control part reading said hibernation state information stored in said non-volatile memory for determining whether said computer is in a hibernation state;

said system control part restoring said computer to a prior operating state by restoring said current operating state information and said current information of said network interface stored in said auxiliary memory to said random access memory;

said system control part determining whether said computer is in a network hibernation state by reading said current information of said network interface restored in said random access memory;

said system control part controlling initialization of an interface between said computer and said network interface when it is determined that said computer is in a network hibernation state; and said computer operating in a stand-alone state after said system control part controls the initialization of an interface between said computer and said network interface or after said system control part determines that said computer is not in a network hibernation state.

15. The network hibernation system as set forth in claim 12, further comprising:

said system control part generating a second control signal when ac power is supplied to said computer or when a user activates a portion of said computer;

said system control part performing an initialization and self-test operation in response to said second control signal;

said system control part reading said hibernation state information stored in said non-volatile memory for determining whether said computer is in a hibernation state;

said system control part restoring said computer to a prior operating state by restoring said current operating state information and said current information of said network interface stored in said auxiliary memory to said random access memory;

said system control part determining whether said computer is in a network hibernation state by reading said current information of said network interface restored in said random access memory;

said system control part controlling initialization of an interface between said computer and said network interface when it is determined that said computer is in a network hibernation state; and said computer operating in a stand-alone state after said system control part controls the initialization of an interface between said computer and said network interface or after said system control part determines that said computer is not in a network hibernation state.

16. The network hibernation system as set forth in claim 15, further comprising:

said network interface performing an initialization and self-test operation when it is desired to transmit data over said network a first time when said computer is in said stand-alone state; and said computer continuously operating according to a state prior to network hibernation after said network interface performs said initialization and self-test operation.

17. The network hibernation system as set forth in claim 12, said means for generating hibernation interrupt signal in response to said time-out signal and said ac-down signal comprising an OR gate.

* * * * *